United States Patent [19]
Turner, Sr.

[11] 3,838,508
[45] Oct. 1, 1974

[54] HEDGE TRIMMER

[76] Inventor: Stephen H. Turner, Sr., 2145 Harlan Rd., Waynesville, Ohio 45068

[22] Filed: Mar. 26, 1973

[21] Appl. No.: 344,744

[52] U.S. Cl. .................................. 30/216, 30/341
[51] Int. Cl. .......................................... B26b 19/02
[58] Field of Search ............ 30/208, 209, 210, 215, 30/216–220, 231, 228, 340, 341; 56/17.6; 16/115

[56] References Cited
UNITED STATES PATENTS

| | | | |
|---|---|---|---|
| 1,897,117 | 2/1933 | Graham | 30/215 |
| 2,540,616 | 2/1951 | Hasslacher | 30/223 X |
| 2,629,220 | 2/1953 | Grieder | 56/17.6 X |
| 2,653,381 | 9/1953 | Rooke | 30/231 X |
| 2,750,666 | 6/1956 | Teagle | 30/218 |
| 2,809,490 | 10/1957 | Oeters | 16/115 X |
| 3,373,490 | 3/1968 | Lendaro | 30/228 |
| 3,721,004 | 3/1973 | Buckles | 30/228 |

*Primary Examiner*—Al Lawrence Smith
*Assistant Examiner*—J. C. Peters
*Attorney, Agent, or Firm*—Biebel, French & Bugg

[57] ABSTRACT

A hedge trimmer of the type having a reciprocating blade projecting from the motor housing or casing is provided with an elongated main handle projecting from the opposite side of the casing. This construction permits the operator to reach out and trim hedges and shrubs with the trimmer held at a distance from the body of the operator without requiring undue muscular effort. It also facilitates handling of the trimmer at close distances, since the extra length of handle as compared to conventional trimmers provides increased leverage. The main handle may be manufactured integrally with the trimmer or built as an attachment for existing trimmers. In either case, the main handle is preferably telescopically adjustable and provided with an elongated switch bar for controlling the trimmer motor. The elongated switch bar extends longitudinally of the main handle so that it is accessible to the operator from a number of positions along the main handle and is spring loaded to the OFF position.

2 Claims, 14 Drawing Figures

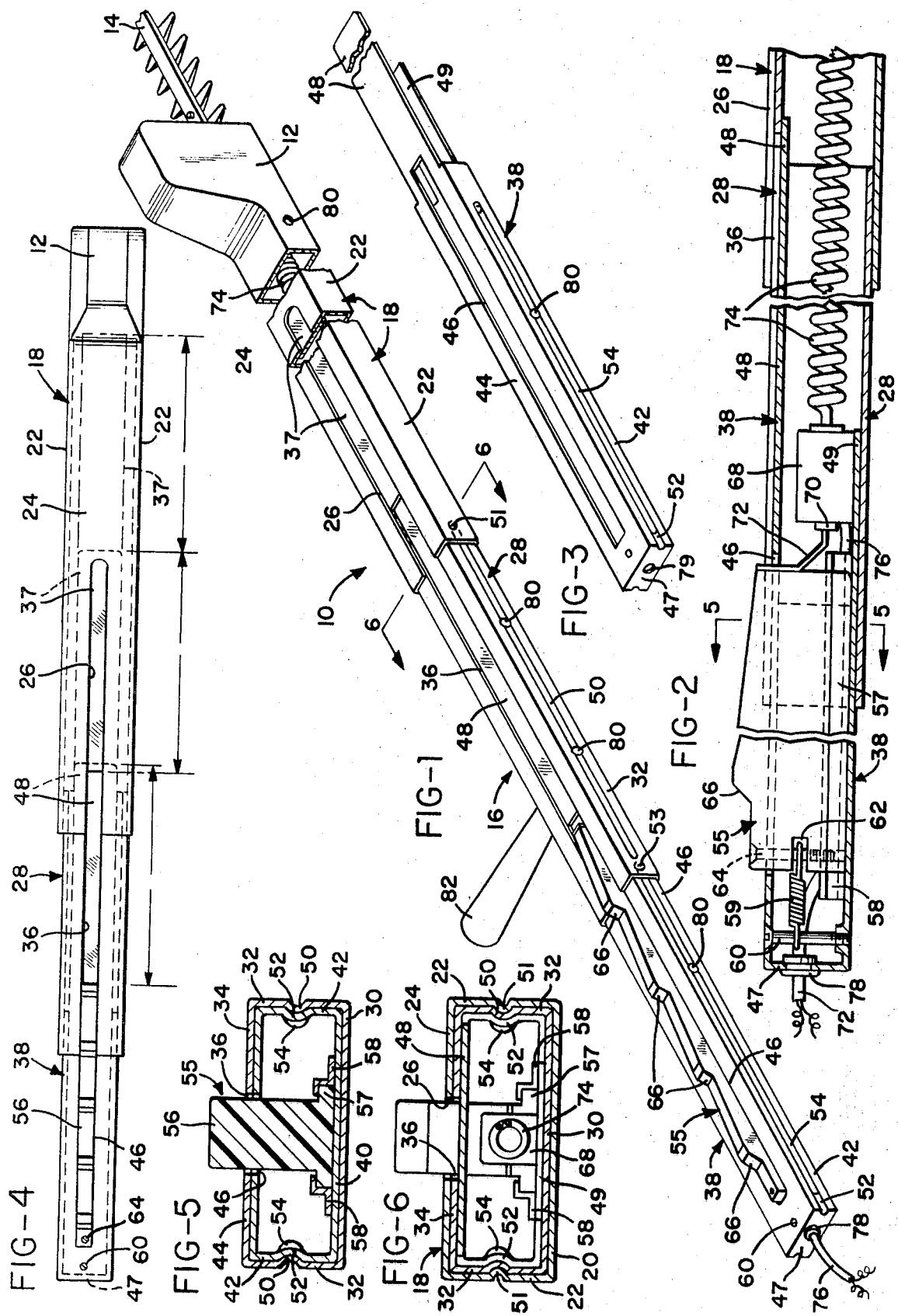

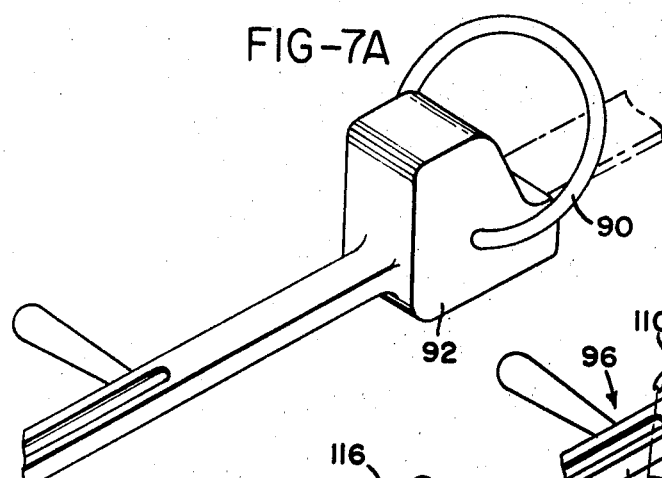
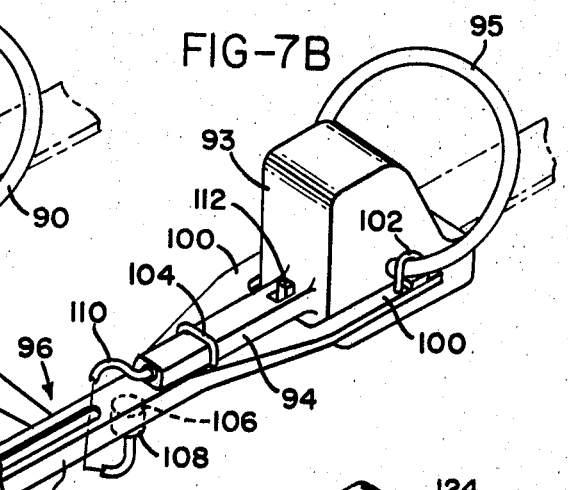
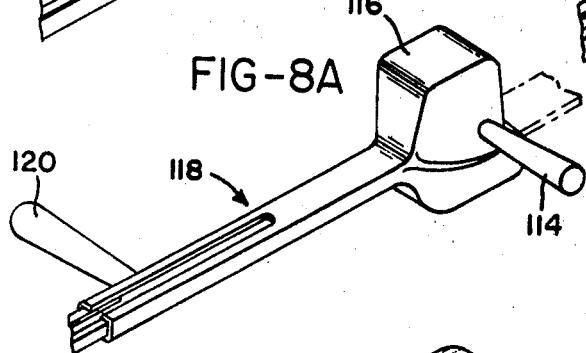
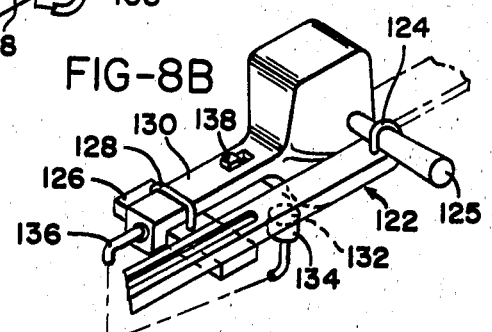
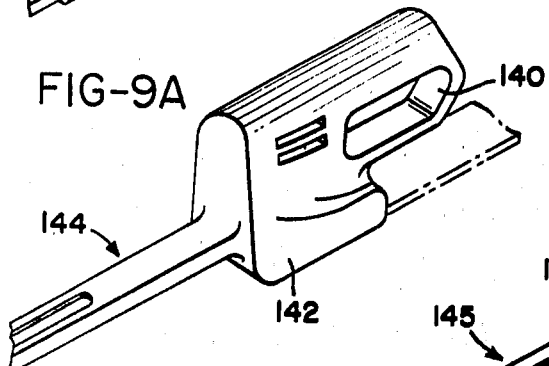
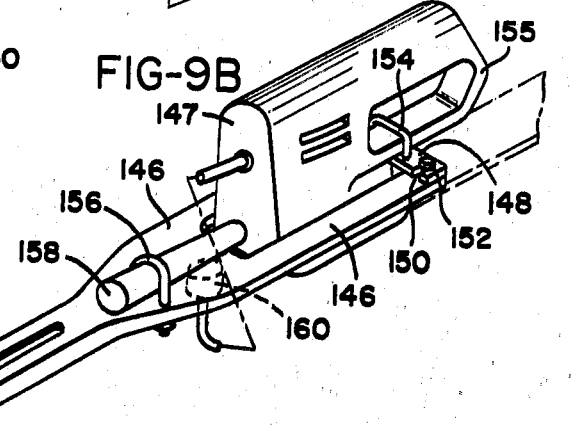
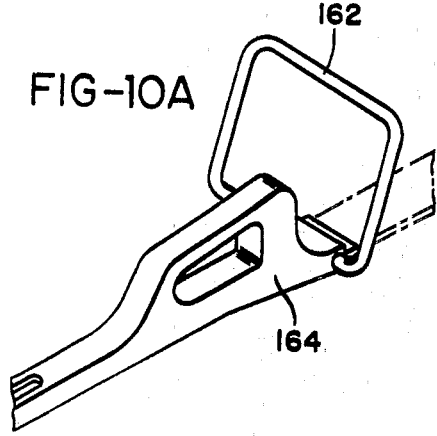
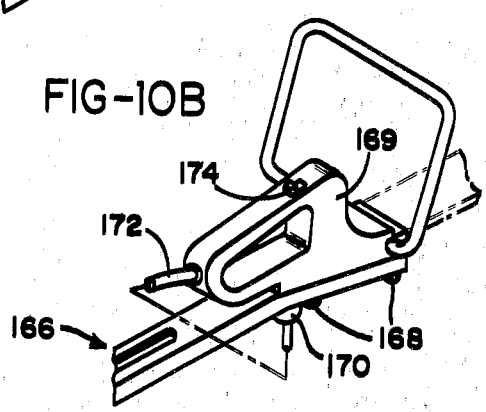

3,838,508

HEDGE TRIMMER

BACKGROUND OF THE INVENTION

Hedge trimmers are generally constructed with an elongated reciprocating blade projecting from a housing or casing enclosing the trimmer motor and gearing and a pair of short handles or a short handle and a loop mounted on the casing and manually grasped by the operator during trimming operations. An on-off switch is usually provided on the casing to control the motor powering the reciprocating trimmer blade.

While trimmers of this general construction can generally be handled by a person of ordinary strength during close in trimming operations, if it becomes necessary to reach out with the trimmers to trim at some distance away from the body of the operator, the trimmer will ordinarily be difficult to handle.

Additionally, an on-off switch mounted on the trimmer casing will often be difficult to reach while holding the trimmer with both hands. If the trimmer operator finds it necessary to support the trimmer with only one hand to turn the trimmer on and off, the likelihood of his dropping it is obviously increased. If the trimmer operator either drops or losses control of a trimmer having a simple on-off switch, the trimmer will continue to run, possibly resulting in both property damage and personal injury.

SUMMARY OF THE INVENTION

A trimmer constructed in accordance with the present invention includes an elongated handle projecting from the trimmer housing or casing and an elongated switch bar extending longitudinally of the main handle and spring loaded to the OFF position.

The elongated handle facilitates trimming operations in which the operator must reach out with the trimmer and hold it at some distance from his body. Additionally, and unexpectedly, rather than the elongated main handle proving awkward during close in operations, it has been found to provide additional leverage which makes handling of the trimmer surprisingly easy.

With the elongated switch bar of the present invention, regardless of whether the trimmer main handle is of extra length in accordance with the present invention or of conventional length, the operator may grasp the main handle of the trimmer at various positions along its length and still be able to control the trimmer motor switch without removing his hand from the main handle. Additionally, should the operator loose his grasp of the main handle for any reason the trimmer motor will ordinarily cease operating since the motor switching is spring loaded open.

The elongated handle may be constructed integrally with the trimmer casing or may be manufactured as an attachment for existing trimmers of conventional construction. In either case, the main handle may be of telescopic construction for compactness for storage and shipping purposes and if, for any reason, it is necessary to operate the trimmer without an extended main handle.

In accordance with the preferred embodiment of the invention, the main handle extends approximately parallel to the trimmer blade, and under optimum conditions is, in fact, aligned with the blade. It will be apparent, however, that some displacement from an aligned condition is acceptable, and in some instances, such as where the main handle is constructed as an attachment, this may be necessary.

Thus, the trimmer of the present invention not only facilitates operations in which the operator must reach out some distance, but also provides better handling for close in operations through the additional leverage gained by the elongated main handle. At the same time, improved motor control is obtained by the use of an elongated switch bar running longitudinally of the main handle and greater safety is provided by utilizing a switch spring loaded to the OFF position.

BRIEF DESCRIPTION OF THE DRAWINGS

FIG. 1 is a perspective view of a trimmer constructed in accordance with the present invention;

FIG. 2 is a partial cross sectional view of the trimmer of FIG. 1;

FIG. 3 is a perspective view of the innermost telescopic section of the extension handle;

FIG. 4 is a top view of a portion of the trimmer of FIG 1;

FIG. 5 is a view taken on line 5—5 of FIG. 2;

FIG. 6 is a view taken on line 6—6 of FIG 1; and

FIGS. 7A through 10B are perspective views of various types of trimmers exhibiting features of the present invention.

DESCRIPTION OF THE PREFERRED EMBODIMENTS

As seen in FIG. 1 of the drawings, a trimmer 10 in accordance with the present invention will include a motor and gear housing or casing 12 from which a reciprocating blade 14 projects forwardly. Although only a portion of the blade 14 is shown in FIG. 1 of the drawings, it will be appreciated that in trimmers of this general type such blades will ordinarily be from approximately a foot to 2 feet in length.

Projecting rearwardly from the casing 12 in substantial alignment with the blade 14 is an elongated main handle indicated in its entirety by the numeral 16. Handle 16 includes a plurality of telescopically associated sections, three being shown for purposes of illustration.

The outermost telescopic section 18 in the embodiment shown in FIG. 1 is formed integrally with the housing 12 and is of tubular construction including, as best seen in FIG. 6, a bottom wall 20, side walls 22 and a top wall 24 having an elongated slot 26 formed medially thereof.

Telescopically received within section 18 is an intermediate section 28 having, as best seen in FIGS. 5 and 6, a bottom wall 30, side walls 32 and a top wall 34 having an elongated slot 36 formed therein. Additionally, intermediate section 28 is provided with forwardly projecting tongue portion 37 slidably received within section 18 and substantially closing the slot 26 therein when the handle is in the extended position shown in FIG. 1 of the drawings.

The innermost or rear section 38 is telescopically received within the section 28 and includes, as best seen in FIGS. 3, 5 and 6, a bottom wall 40, side walls 42, a top wall 44 having a slot 46 extending longitudinally thereof and an end wall 47. Section 38, as best seen in FIG. 3, also includes a top tongue portion 48 formed integrally therewith and telescopically received in the intermediate section 28 to close the slot 36 thereof in the extended position of the handle. A bottom tongue section 49, which is of considerably less length than the top tongue 48, projects forwardly from the bottom wall 40 of section 38 for a purpose described below.

The intermediate section 28 is provided with depressed portions 50 pressed in each of the side walls 32 thereof and forming longitudinally extending grooves, and the outermost section 18 is provided with button-like depressed portions 51 which ride in the grooves 42 and prevent separation of the two sections. Similarly, the innermost section 38 is provided with a longitudinally extending depressed portions 52 forming grooves in each side wall thereof which are engaged by a depression 53 in the intermediate section 28 and prevents separation of these two sections.

Preferably the groove 52 extends from end to end of each of the side walls 42 of member 38 at a depth sufficient to accommodate the inwardly depressed grooves 50 in section 28 and is provided with a second pair of grooves 54 which are coincident for a portion of their length with grooves 52 but which terminate inwardly of the ends of the section 38. Grooves 54 are deeper than the grooves 52 and the depression 53 is depressed inwardly of the section 28 a distance sufficient to ride in the bottom of deeper grooves 54 in the section 38 and prevent separation of the sections 28 and 38.

An elongated switch bar 55 of substantially inverted T-shape in cross section is received in the section 38 with the stem 56 of the T projecting upwardly through the slots in the handle 16 and the head 57 of the T engaged by substantially Z-shaped brackets 58 which form a slideway extending longitudinally of the handle. A coil spring 59, as seen in FIG 2, has one end anchored by means of a bolt or the like 60 at the rear of the section 38 while the forward end of the spring is anchored in a slot 62 formed in the rear of the switch bar 55 by means of a bolt or the like 64.

With this construction, it will be seen that the switch bar 55 may be pushed forwardly, preferably by engagement with any one of the offsets 66 in the upper surface of the switch bar, while the spring 59 will tend to move the switch bar to the rear of the section 38. Mounted on the bottom tongue 49 is a switch 68 having a contact 70 for engagement by a blade contact 72 mounted on the forward end of the switch bar 55. A resiliently coiled wire 74 is electrically connected through the switch 68 and extends forwardly of the handle to a motor (not shown) for driving the blade 14. An additional conductor 76 also extends from the switch 68 and outwardly through a bushing 78 fixed to an opening 79 in the rear end of the section 38.

While in the above description the switch bar is specifically described as mounted in the handle so that it projects from the top thereof, it will be apparent that through the application of the same principles of design the switch may also be mounted in the handle projecting from the bottom or either side thereof. Additionally, as noted above, the elongated switch bar may be used in accordance with the present invention in trimmer handles of conventional length as well as in the elongated main handle described herein in detail.

The housing 12 and the sections 28 and 38 may be provided on both side walls thereof with threaded openings 80 which are adapted to receive a complementarily screw threaded shaft (not shown) on an auxiliary handle 82. With this construction, the auxiliary handle may be positioned at any of a plurality of positions along the trimmer.

In operation, the handle 16 of the trimmer will ordinarily be extended to its full length, since, as noted above, not only does the extra length of the handle facilitate trimming operations in which the operator must reach out some diestance from his body, but close in trimming operations have also been found to be easier because of the additional leverage provided by the handle 16.

In the fully extended position, the tongue 37 on the intermediate section 28 closes the slot 26 in the outermost section 18 while the tongue 48 on section 38 closes the slot 36 in the intermediate section 28 to prevent the entry of dirt, trimmings, etc., into the interior of the handle. By way of example, the intermediate and innermost sections 28 and 38 may be approximately 12 inches in length, with approximately 3 inches overlap in their fully extended positions, while the outermost section 18 is of sufficient length to permit the sections 28 and 38 to be telescoped thereinto.

In the closed position of the handle 16 the upper tongue 48 of section 38 will lay beneath the tongue 37 of the section 28 and both will be positioned beneath the top wall of the section 18 forwardly of the slot 26 therein. Additionally, in this collapsed position the slots 26, 36 and 46 will be substantially aligned, accommodating the upwardly projecting stem 56 of the switch bar 55. It will also be noted that the wire 74 will move from an extended position to a tightly coiled position when the handle sections are telescoped.

In the embodiment shown in FIG. 1 of the drawings, the auxiliary handle 82 is attached to the main handle 16 and extends at right angles thereto. However, as shown in FIG. 7A of the drawings, a loop type handle 90 may also be provided, pivotally attached to the housing 92.

Additionally, it will be possible to adapt an existing trimmer having a conventional short handle 94 and a loop handle 95, as seen in FIG. 7B of the drawings, to provide it with an extension handle 96 in accordance with the present invention. The extension handle 96 is in all respects the same as shown in FIG. 1 except that the outermost section 98 thereof is adapted to be attached to an existing trimmer.

Thus, the forward end of the section 98 is of bifurcated construction, including a pair of legs 100 adapted to straddle opposite sides of the casing 93 and be attached to the handle 95 by means of U-shaped clamps 102. Additionally, a U-shaped clamp 104 engages over the existing handle 94 and a socket 106 is provided to receive a plug 108 attached to the relatively short cord 110 of the trimmer.

Plug 106 is, of course, connected by means of a coiled wire, as at 74 in FIG. 2 of the drawings, to a switch mechanism of the type shown in FIG. 2 of the drawings. In this regard, a switch 112 will ordinarily be provided on the casing or housing 93 and this will be switched to the ON position and control of the trimmer motor is then through the switch bar 55.

FIG. 8A illustrates another embodiment of the invention in which a second auxiliary handle 114 projects from a side of the trimmer housing 116. An elongated main handle a portion of which is shown at 118, extends rearwardly from the housing 116 and may be provided with an additional auxiliary handle 120 similar to the handle 82 shown in FIG. 1 of the drawings.

In converting an existing trimmer of the general configuration shown in 8B, a handle 122 is provided which is the same as the handle 16 except that its forward end is modified as shown in FIG. 8B. Thus, the forward end of the handle is provided with a U-shaped clamp 124 that locks over the auxiliary handle 125 and a bracket 126 extends at right angles to the handle 122 and is provided with a U-shaped clamp 128 for attachment over the existing handle 130 of the trimmer. A socket 132 will also be provided to receive the plug 134 on the cord 136 of the trimmer, similarly to the arrangement shown in FIG. 7B. Again, the switch 138 on the trimmer will be switched to the ON position and the trimmer motor controlled by the switch mounted in the main handle.

FIG. 9A shows still another embodiment of the present invention wherein an auxiliary handle 140 is formed integrally with the housing 142 of the trimmer and the main handle 144 extends rearwardly therefrom. In FIG. 9B an existing trimmer has a trimmer handle 145 in accordance with the present invention attached thereto by modifying the forward end of the handle to the bifurcated construction shown in FIG. 9B.

Thus, a pair of legs 146 extend on opposite sides of the housing 147 and a plate member 148 is pivoted on one of the legs 146 and is slotted, as at 150, to receive a bolt 152 screw threaded into a leg 146. A U-shaped clamp 154 straddles the handle 155 and is attached to the plate blade 148 while a second U-shaped clamp 156 engages the existing handle 158 of the trimmer. Again, a socket 160 is provided in the handle 145 to receive a plug from the existing unit and a switch (not shown) on the housing 147 will be switched on and the unit controlled by the switch bar of the extension handle.

FIG. 10A shows still another type of loop auxiliarly handle 162 pivotally attached to a housing 164. Where an extension handle in accordance with the present invention is to be attached to an existing trimmer of this same general configuration, as shown in FIG. 10B, the end of the extension handle 166 is provided with bolts 168 which may be threaded upwardly into holes tapped in the bottom of the housing 169. The plug 170 for the cord 172 will be received in a socket in the end of the handle 166 and the existing switch 174 for the trimmer will be switched to the ON position with control of the trimmer motor being by means of the switch in the main trimmer handle 166.

From the above it will be seen that the present invention provides an improved trimmer construction wherein the trimmer may be operated while being held at some distance from the body of the operator and yet, also improves handling of the unit for close in trimming. Additionally, an easily accessible switch is provided, spring loaded to the OFF position to prevent continued operation of the trimmer should the operator loose control thereof and readily accessible to the operator during trimming operations.

While the forms of apparatus herein described constitute preferred embodiments of the invention, it is to be understood that the invention is not limited to these precise forms of apparatus, and that changes may be made therein without departing from the scope of the invention.

What is claimed is:
1. A hedge trimmer comprising:
 a. a motor housing,
 b. elongated trimmer blade means projecting from said housing,
 c. an elongated main handle having a length at least approximately as long as said blade means projecting from said housing oppositely to said blade means,
 d. said main handle being adjustable in length and comprising a plurality of telescopically related sections, and
 e. switch means mounted in the one of said telescopically related sections positioned farthest from said blade means, said switch means including an elongated switch bar mounted in and extending longitudinally throughout substantially the length of the section in which said switch means is mounted.
2. The trimmer of claim 1 wherein:
 a. said sections are slotted to accommodate said switch bar when said sections are in nested relationship to each other, and
 b. means are provided for closing said slots when said main handle is extended.

* * * * *